United States Patent
Hagirahim et al.

(10) Patent No.: US 6,751,218 B1
(45) Date of Patent: Jun. 15, 2004

(54) METHOD AND SYSTEM FOR ATM-COUPLED MULTICAST SERVICE OVER IP NETWORKS

(75) Inventors: Hassan Hagirahim, Long Branch, NJ (US); Francis R. Waldman, Fair Haven, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/514,074

(22) Filed: Feb. 26, 2000

(51) Int. Cl.[7] .................................................. H04L 12/66

(52) U.S. Cl. ........................ 370/390; 370/401; 370/432

(58) Field of Search ............................... 370/352, 353, 370/354, 395.1, 395.52, 395.53, 395.5, 395.6, 432, 466, 467, 473, 356, 390, 400, 401, 389

(56) References Cited

U.S. PATENT DOCUMENTS

| | | | | |
|---|---|---|---|---|
| 5,828,844 A | * | 10/1998 | Civanlar et al. | 709/228 |
| 6,018,766 A | * | 1/2000 | Samuel et al. | 709/218 |
| 6,272,134 B1 | * | 8/2001 | Bass et al. | 370/390 |
| 6,522,667 B1 | * | 2/2003 | Oda et al. | 370/474 |

OTHER PUBLICATIONS

Grilo et al. "VTOA/VoIP/ISDN Telephone Gateway", IEEE ICATM '99. Jun. 21, 1999–Jun. 23, 1999. Pages 230–235.*
Kowtha et al. "Encapsulating ATM Cells in TCP/IP for Transport Between ATM Based Backbone and End–User Terminals, to Enable Real–Time Network–Aware Services". IEEE ATM Workshop. May 24, 1999–May 27, 1999. Pages 195–203.*
Bagwell et al. "A Comparision of Native ATM–Multicasting to IP–Multicasting With Emphasis on Mapping Between the Two". IEEE. 1995. Pages 189–193.*
Canosa et al. "Design and Evaluation of a MARS Model Implementation". IEEE ATM Workshop Proceedings. May 26, 1998–May 29, 1998. Pages 349–354.*

* cited by examiner

*Primary Examiner*—Chi Pham
*Assistant Examiner*—Derrick W Ferris

(57) ABSTRACT

ATM-coupled multicast data are transmitted to a multiplicity of ATM users over an IP backbone by having a controller in the IP backbone translate a pre-stored Multicast Initiating Address into a multiplicity of pre-stored pairs of addresses, each pair composed of a user's ATM destination address and the IP address of the (user) gateway serving the user's ATM destination, then establishing connections between the multicast source ATM address and each of the user's ATM addresses, having IP routers attach the user gateways to the multicast group, and encapsulating the multicast data ATM cells in IP packets for routing to the user gateways, and decapsulating the multicast data ATM cells for routing to the user ATM addresses.

20 Claims, 5 Drawing Sheets

METHOD AND SYSTEM FOR ATM-COUPLED MULTICAST SERVICE OVER IP NETWORKS

RELATED APPLICATIONS

This application is related to U.S. application Ser. No. 09/400,609 filed Sep. 20, 1999 of the same inventors as this application and assigned to the same assignee as this application.

FIELD OF THE INVENTION

This invention relates to communication network services for transporting ATM (Asynchronous Transfer Mode) cell traffic over IP (Internet Protocol) based networks, and particularly to ATM-coupled multicast service over IP networks.

BACKGROUND OF THE INVENTION

IP multicasting involves the transmission of IP datagrams to a "host group", a set of zero or more hosts identified by a single IP destination address. Internet forwarding of IP multicast datagrams is handled by "multicast routers" which may be co-resident with or separate from the internet gateways. Multicasts save bandwidth by routing a single datagram once through an IP backbone from the backbone to a multiplicity of destinations.

Because ATM and IP protocols are mainly incompatible, it is difficult for ATM systems to partake of the advantages of the IP multicasting. The aforementioned application Ser. No. 09/400,609 filed Sep. 20, 1999 discloses transmission of each ATM cell in a single IP packet over an IP backbone. However, this still does not offer the advantages of multicast service.

SUMMARY OF EMBODIMENTS OF THE INVENTION

According to an embodiment of the invention, ATM-connected multicast data are transmitted to a multiplicity of ATM users over an IP backbone by having a controller in the IP backbone translate a pre-stored Multicast Initiating Address into a multiplicity of pre-stored pairs of addresses, each pair composed of a user's ATM destination address and the IP address of the (user) gateway serving the user's ATM destination, then establishing connections between the multicast source ATM address and each of the user's ATM addresses, encapsulating the multicast data ATM cells in IP packets for routing to the user gateways, and decapsulating the multicast data ATM cells for transmission to the user ATM addresses.

These and other aspects of the invention are pointed out in the claims. Other advantages and objects of the invention will become evident from the following detailed description of various embodiments when read in light of the following drawings.

DETAILED DESCRIPTION OF PREFERRED EMBODIMENTS

Figure 1:
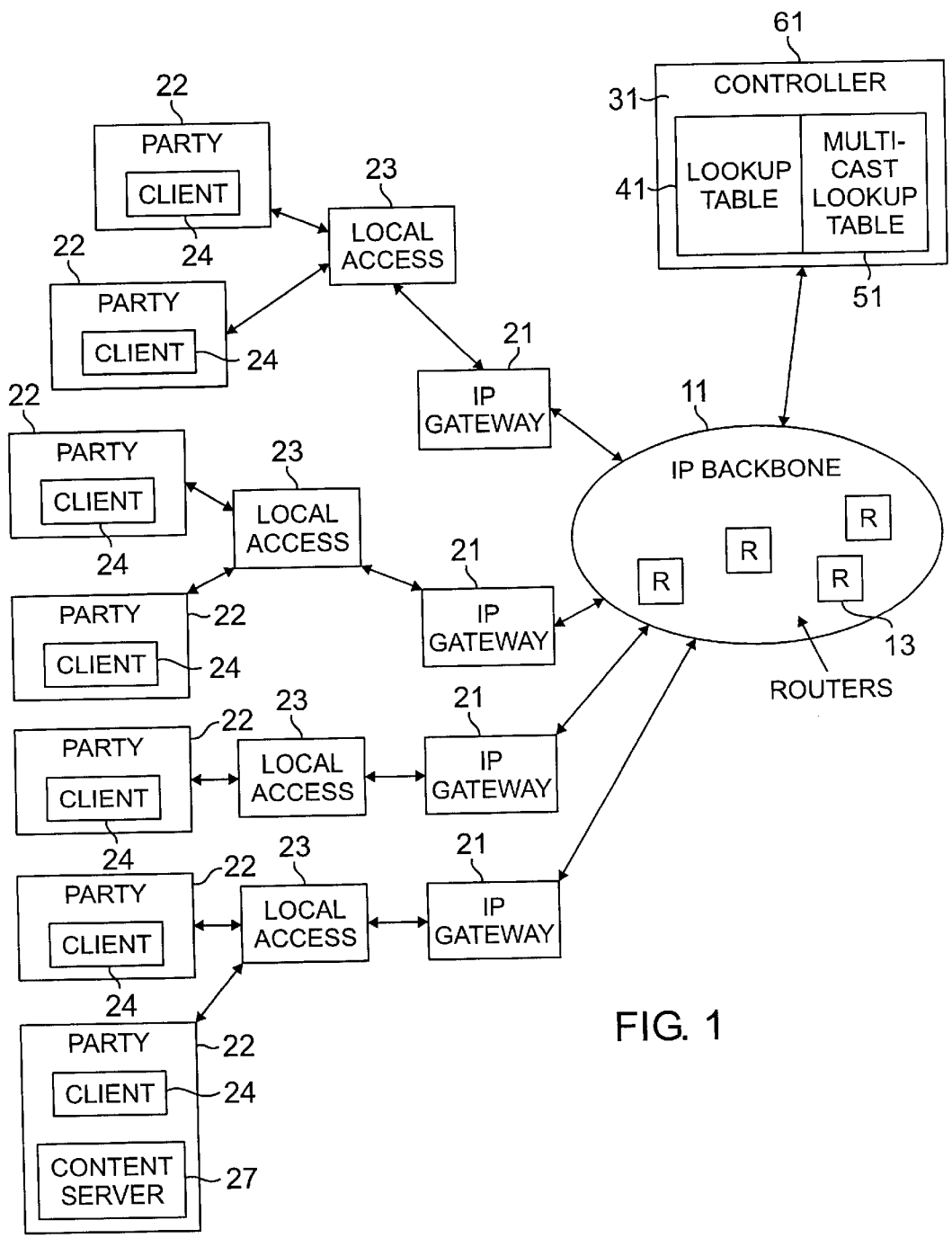
FIG. 1 is a block diagram of an embodiment of the invention for multicasting ATM data over an IP backbone.

FIG. 1 is a schematic block diagram of an embodiment of the present invention. Here, an IP backbone 11, with routers 13, is coupled to a plurality of IP gateways 21. The gateways 21 receive ATM cells from endpoints that carry IP packets to be routed into the IP backbone, and conversely receive IP packets from the IP backbone to be routed to appropriate ATM endpoints or IP endpoints. The endpoints are parties 22 that pass signals to the gateways 21 via local accesses 23. The latter may be embodied in many ways. One embodiment is in the form of a passage that includes residential gateways in the subscriber premises, through asynchronous digital subscriber lines (ADSL) and digital subscriber line access multiplexers (DSLAMs) that multiplex traffic from ADSLs. In other embodiments the accesses 23 constitute cable modems and cables, cable TV (television) connections, and in still another satellite connections.

In the example shown, each of the parties 22 includes a client 24 and one of the parties 22 is a multicast source and includes a content server 27 for multicasting and other purposes. A controller 31 interconnected with each gateway 21 through the IP backbone 11 controls the overall gateway operation. The various segments of the IP backbone can take the form of any of a variety of transmission facilities such as fiber, copper, or air as the transmission medium. The system may have several multicast services from various multicast sources.

For each multicast service (only one is described here), the controller 31 includes a destination lookup table 41 and a Multicast lookup table 51. The destination lookup table 41 and multicast lookup table 51 together form a composite lookup table 61.

An ATM cell arriving at a gateway 21 is encapsulated within an IP protocol and is routed to the IP backbone 11. Similarly, an IP encapsulated ATM cell arriving at a gateway 21 from the IP backbone is decapsulated and routed to an endpoint or party 22 by way of the access 23. An overview of the process follows.

The process starts by establishing connections between parties and gateways. Generally to establish connections a party 22 uses access 23 to transmit an ATM UNI (User to Network Interface) signaling message to an IP gateway 21 (the source gateway). The IP gateway 21 terminates the ATM UNI signaling message and utilizes an intermediate signaling protocol to transmit a message to the controller 31. In the message, the controller 31 stores and recognizes three types of addresses, namely, (1) an ATM destination address for a point-to-point call, (2) an ATM Multicast Initiating Address (MIA) which is not a destination address but arises from a multicast provider for connection to one or more hosts, and (3) An ATM Multicast Access Address (MAA) stored in the controller 31 for one multicast service. The latter is used when a party 22 or client 24 seeks to connect to a multicast group or tree (for example to receive music or other continuously multicast data). The multicast group or tree represents the parties or hosts that are at any time connected to and are using the multicast. Once a host connects to the multicast and receives data from the multicast source, that host becomes a member of the multicast group or tree. The multicast tree may in fact be empty at times.

The three addresses recognized by the controller 31 serve for three cases. Case 1 constitutes a point-to point call, case 2 a multicast-to-hosts call, and case 3 a host-to-multicast call.

The aforementioned co-pending application Ser. No. 09/400,609 filed Sep. 20, 1999 discloses the point-to-point call of case 1. Here, an ATM destination address for a point-to-point call causes the controller 31 to use the lookup table 41 to return an IP gateway address connected to the local access 23 of the destination party 22. A call is established between source and destination IP gateways 21, and data transfer proceeds by encapsulation of ATM cells in IP packets at the IP source gateway. This is followed by routing over the IP backbone to the designated destination gateway, decapsulation of the ATM cells from the IP packets, and rerouting over an access 23 to the receiving party 22. Further details of this operation appear in the co-pending application.

Case 2 involves embodiments of the present invention and concerns calls from the multicast source to hosts. Here, the gateway 21 transmits a Multicast Initiating Address (MIA) to the controller 31. The MIA appears in form to the gateway like an ATM destination address, for example an 800 telephone number. However, in the controller 31 the Multicast Initiating Address, behaves not as an ATM-destination address but like a pointer to the lookup table 5 1. The latter causes the controller 31 to furnish the IP source gateway with a number of pairs of ATM/IP addresses for that multicast service. Each pair includes an ATM host's (multicast user party 22) destination address and an IP gateway (host gateway) address of the gateway 21 to which a local access 23 connects the ATM host. In addition to the pairs of ATM/IP addresses, the controller 31 also provides the IP source gateway 21 with an IP Multicast Assigned Address to receive data. The IP Multicast Assigned Address is the address of the multicast group and is also referred to as the Multicast Group Address.

In general, after providing the addresses, connections are established between the multicast ATM source and ATM hosts with the ATM addresses in the ATM/IP pairs. (Details of the connection follow with respect to FIGS. 2 to 6.) One or more of each of the routers 13 in the IP backbone 11 is associated with each IP gateway 21. Of the IP gateways, those having the IP addresses in the ATM/IP pairs, request routers to attach the IP host gateways to the multicast and thus form the multicast group or tree. The IP multicast data is then encapsulated in ATM cells at the source with an IP and sent to the gateway 21. At the gateway 21 each of the ATM cells is encapsulated in an IP multicast packet with an IP Multicast Assigned Address and sent to the IP backbone 11. (Each IP multicast packet may encapsulate one or more of the ATM cells.) The IP packets are routed to the IP host gateways over the IP backbone. The gateways 21 decapsulate the ATM cells from the IP packets and transmit the ATM data to the hosts, i.e. parties 22.

The above example deals with the start of a multicast. In an embodiment the multicast source continuously "broadcasts" data or music or other information. Ih that circumstance the hosts may continuously remain connected to the multicast group. On the other hand a host may leave the group and wish to return. Case 3 concerns such a situation.

Case 3 concerns hosts wishing to access the multicast group according to an embodiment of the present invention. Here, the requesting host uses the aforementioned ATM Multicast Access Address that is stored in the controller 31 for a multicast service from multicast source. When the ATM address at the gateway 21 is a Multicast Access Address from a host wishing connection to the multicast service, the gateway connected to the requesting host terminates the ATM signaling message and uses the intermediate signaling protocol to send the Multicast Service Address to the controller 31. The latter returns the IP multicast address to the host gateway. The IP host gateway sends an IGMP (Internet Group Management Protocol) message to its associated router requesting attachment to the multicast group. Encapsulating IP packets arrive at the host gateway and the latter decapsulates the ATM cells from the IP packets and forwards them to the requesting party.

Details for the multicast to hosts and host to multicast cases described above follow with respect to FIGS. 2, 3, 4, 5 and 6.

Multicast to Hosts Calls

Figure 2:
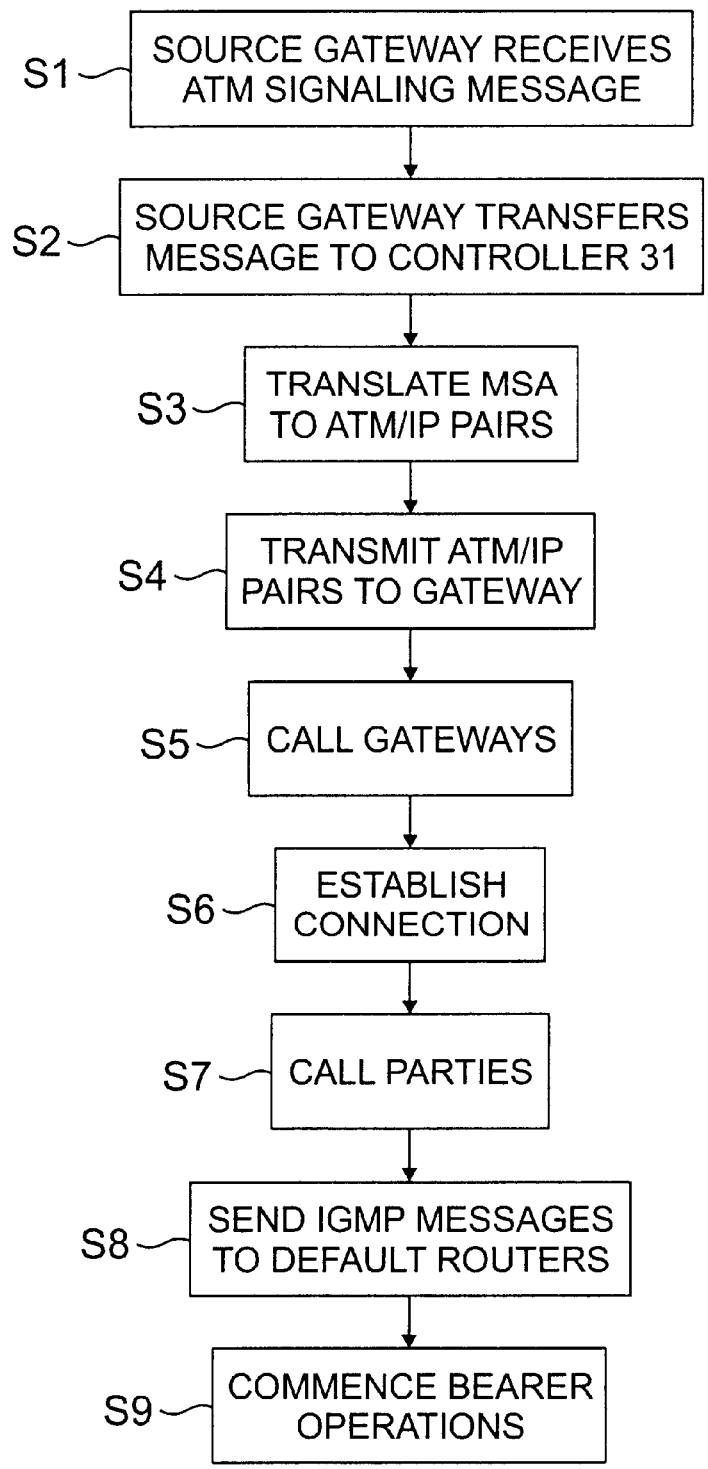
FIG. 2 is a flowchart of a signaling operation suitable for multicasting ATM data over an IP backbone.

FIG. 2 is a flowchart illustrating an ATM signaling operation implemented in accordance with the invention. In step S1, a gateway 21, the source gateway, receives an ATM signaling message (SETUP) containing the Multicast Initiating Address (MIA) and the IP Multicast Service Address preferably in the Called Party Subaddress Information Element. The latter is used by the server 27 as the destination address in the IP multicast packets. In step S2, the source gateway 21 terminates the ATM signaling message, converts the message to an intermediate signaling protocol, and tansfers the signaling message to the controller 31.

According to a preferred embodiment, the intermediate signaling protocol between the gateway 21 and the controller 31 is based on ITU recommendation H.323. H.323 is an umbrella recommendation from the International Telecommunications Union (ITU) that sets standards for multimedia communications over IP-based networks that do not provide for guaranteed Quality of Service (QoS) and is particularly appropriate for certain classes of ATM traffic.

In step S3, the controller 31 provides a translation function for translating the MIA to pairs of IP/ATM addresses by way of the look-up table 51. The use of look-up tables allows the IP addresses and the ATM addresses to be completely independent of each other. The lookup table 51 in controller 31 translates the MIA to pairs of addresses, each pair composed of an individual ATM subscriber destination address and an individual IP address of the gateways to which one or more of the subscribers are attached. In addition, to the pairs of ATM/IP addresses, the controller 31 also provides the IP source gateway with an IP Multicast Assigned Address. This address is used as a destination IP address within the IP backbone 11.

The ATM Multicast Initiating Address (MIA) is an address which has been allocated by the IP service provider at an earlier time at the request of the multicast source data provider such as the party 22 with the content server 27. The IP service provider has entered pairs of addresses, each composed of individual ATM subscriber address and an individual IP address, in the Multicast lookup table 51 at the earlier time and at the request of the data provider. The pairs of addresses represent a list of the multicast data provider's subscribers and users. In addition to the pairs of ATM/IP addresses, the provider has entered the IP Multicast Assigned Address and the Multicast Access address in the controller 31. The IP Multicast Assigned Address can also be allocated dynamically.

In step S4, after performing the translation, the controller 31 transmits, to the originating source gateway 21, an H.323 signaling message that includes the one or more pairs of ATM/IP addresses and the IP Multicast Assigned Address. In step S5, the source gateway calls the destination gateways.

In step S6, the source gateway sends signaling (SETUP) messages to the destination gateways instructing them to make the call to the connected parties indicated in the ATM addresses returned by the controller. The signaling messages between the source and the destination gateways are similar to the H.323 protocol, which uses the ITU Q.931 signaling format. The messages exchanged between the source gateway and the destination gateways are a modification of the H.323 protocol using the ITU Q.2931 signaling format (rather than the ITU Q.931 signaling format) and closely resembles the ATM User-to-Network Interface (UNI) signaling format. In the signaling message, the originating source gateway tells the destination gateways the ATM address of the called party as well as the IP Multicast Service Address.

In step S7, the destination gateway or gateways send SETUP messages to their attached parties 22 with which they provide the party with the IP Multicast Service Address preferably in the Called Party Subaddress Information Element. After the party 22 responds, it will confirm to the source gateway 21 that the destination gateway has, or destination gateways have, connected the end users. The source and destination gateways proceed to establish the bearer logical channel (IP Multicast Assigned Address using an H.245 control channel). In step S8, the destination gateways send IGMP (Internet Group Management Protocol) messages to default routers in the IP backbone requesting attachment by the controller 31 to the multicast group. In step S9 bearer operations commence between the source and the destination gateways.

During bearer operations in step S9, the ATM data to be multicast is then encapsulated in IP packets with the destination address the IP Multicast Service Address and multicast over the IP backbone 11. Upon receiving the IP multicast packets the gateways 21 decapsulate the ATM data from the IP packets and transmit the ATM data to the hosts, i.e. parties 22.

Figure 3:
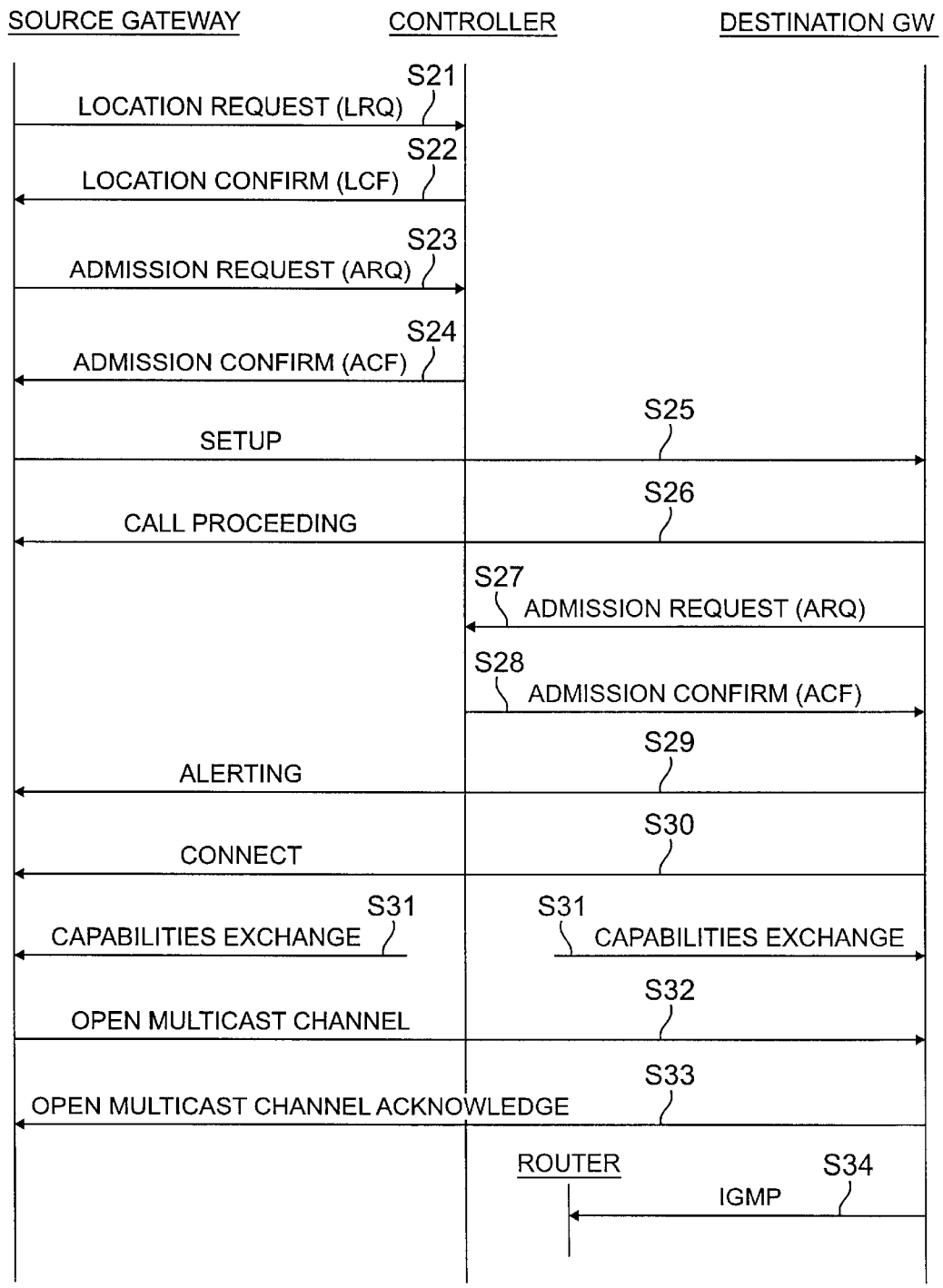
FIG. 3 is a detailed flow diagram of a signaling operation suitable for multicasting ATM data over an IP backbone.

FIG. 3 is a detailed call flow diagram illustrating the procedure followed for transmission of ATM traffic over the IP backbone. In step S21, when the source gateway 21 finds a Multicast Initiating Address (MIA), a Location Request (LRQ) message is transmitted (step S2 in FIG. 2) using the H.225 protocol to the controller 31 of the IP backbone 11. The lookup table 51 in the controller 31 translates the MIA to pairs of addresses (step S3 in FIG. 2), each pair composed of an individual ATM subscriber destination address and an individual IP address of the gateways to which one or more of the subscribers are attached. The controller 31 also provides the Multicast Assigned Address. In step 22, the controller 31 transmits a Location Confirm (LCF) message back to the source gateway 21, again using the H.225 protocol with the pairs of addresses. The controller also then transmits the Multicast Assigned Address. (Step 4 in FIG. 2.)

In step S23, after the LCF message is received by the source gateway, an Admission Request Message (ARQ) is sent to the controller 31. In step S24, the controller 31 grants permission for the call to take place between the gateways by an Admission Request Confirm (AFC) command issued to the source gateway. (Step 5 in FIG. 2.)

In step S25, the source gateway sends a Q.2931 setup message to the destination gateways. The Q.2931 setup message transports relevant calling parameters including the virtual channel and virtual path (VCI/VPI) information element used to assign ATM virtual channels between the source gateway and the destination gateway. Also, in the signaling message, the originating source gateway tells the destination gateways the ATM address of the called parties as well as the IP Multicast Service Address. (Step 6 in FIG. 2.) In step S26 an H.225 call proceeding message is subsequently sent from the destination gateways to the source gateway. The message informs the source gateway that call setup is in progress. (Step 6 in FIG. 2.)

In step S27 the destination gateways send an ARQ message to the controller 31 to check whether the destination gateways may be allowed to take the call. In step S28, an ACF message transmitted to the destination gateways confirms that the destination gateways are allowed to take the call. In step S29, an alerting message is sent from the destination gateways to the source gateway to inform the source gateway that the destination gateways have contacted the end user by "ringing" on the destination side. In step S30, the destination gateways send a connect message to the source gateway when the called parties "answer". In step S31, a series of H.245 messages are used to exchange capabilities, such as bandwidth, between the source and the destination gateway or gateways.

In step S32, an Open Multicast Channel Message with IP Multicast Assigned Address is transmitted from the source gateway to the destination gateways. That message is a request to open an H.245 protocol logical channel or port number dedicated to data transmission between the source gateway and the destination gateways. In step S33, the gateways acknowledge the opening of the logical channel by the Open Logical Channel Acknowledging Message.

In step 34, the destination gateways send IGMP messages with the IP Multicast Assigned Address to their routers to join the multicast group.

Once the logical channels have been established, the IP bearer packets can be transmitted and received between the source and destination gateways. ATM cells are encapsulated in the source gateway and decapsulated in the destination gateways.

Host to Multicast Provider

A multicast ATM source may multicast music or video broadcasts continuously to a host group, and a subscribing user may wish to connect the continuous performance and join the group. In that case the user calls the ATM Multicast Access Address. As described, upon receipt of an ATM signaling message in step S1, the host's originating gateway terminates the ATM signaling message and converts the message to an H.323 LRQ message in step S2 to obtain address translation in the controller 31. In step S3 the controller 31 translates the ATM Multicast Access Address to a pair of addresses, namely the ATM address of the multicast source and the IP address of the gateway to which the multicast source is connected plus an IP Multicast Assigned Address. The ATM address of the multicast source and the IP address of the gateway to which the multicast source is connected are used to set up a point-to-point connection between the client (host) and the multicast server for purposes such as payment, content selection, etc. Once the point-to-point connection is set up the server transmits the IP Multicast Service Address to the client (host).

In step S8 the gateway at the calling host sends IGRP (Internet Gateway Routing Protocol) messages to default routers in the IP backbone requesting attachment to the multicast group. Step S9 follows.

Bearer Operations

Figure 4:
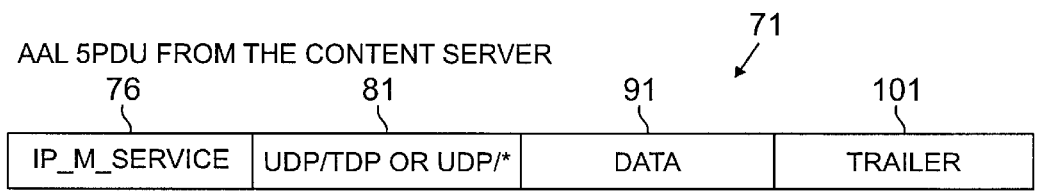
FIG. 4, is a diagram illustrating multicast data from a source of multicast data
Figure 5:
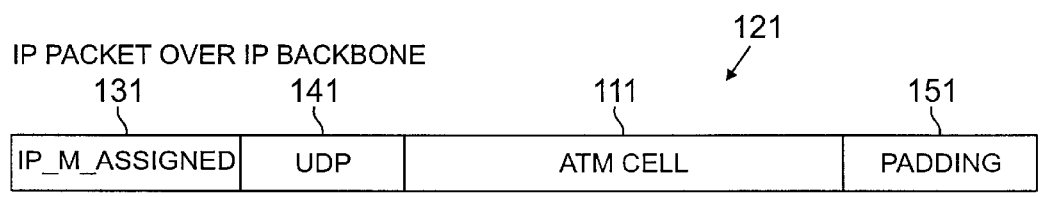
FIGS. 5 and 5A are diagrams illustrating ATM-connected multicast bearer operations over IP networks.

FIGS. 4 and 5 are diagrams illustrating ATM-connected multicast bearer operations over IP networks. FIG. 4 illustrates an AAL 5 PDU message portion 71 from the content server 36. The latter includes an IP_M_tree segment 76, a UDP/RTP or UDP/*segment 81, a data segment 91, and an AAL 5 PDU trailer 101. The "*" here and in FIG. 5 represents a transport protocol for reliable multicast, RFC 1301. The portion 71 is chopped into ATM cells. FIG. 5 shows an ATM cell 111 encapsulated in an IP packet 121. Aside from the ATM cell, the IP packet 121 includes an IP_M_assigned segment 131, a UDP and IP segment 141, and padding 151 if required.

Figure 5A:
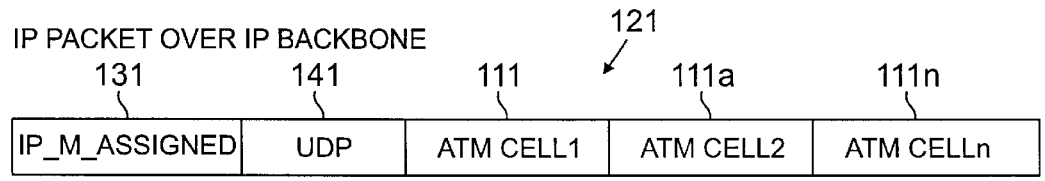

FIG. 5A is a diagram similar to FIG. 5 except that the IP packet encapsulates n ATM cells 111, 111a, and 111n. The diagram illustrates that, according to embodiments of the invention, the IP packet encapsulates two or more ATM cells. Here, the padding 151 is not used.

Once a call is established between endpoints by signaling messages, the gateways transmit IP packets, which include encapsulated ATM cells. Upon receiving an IP packet containing an ATM cell, the receiving gateway extracts the ATM cell by decapsulating the IP header and trailer and transmitting the ATM cell to the appropriate endpoints through the corresponding ATM local access 23.

Other Embodiments

Figure 6:
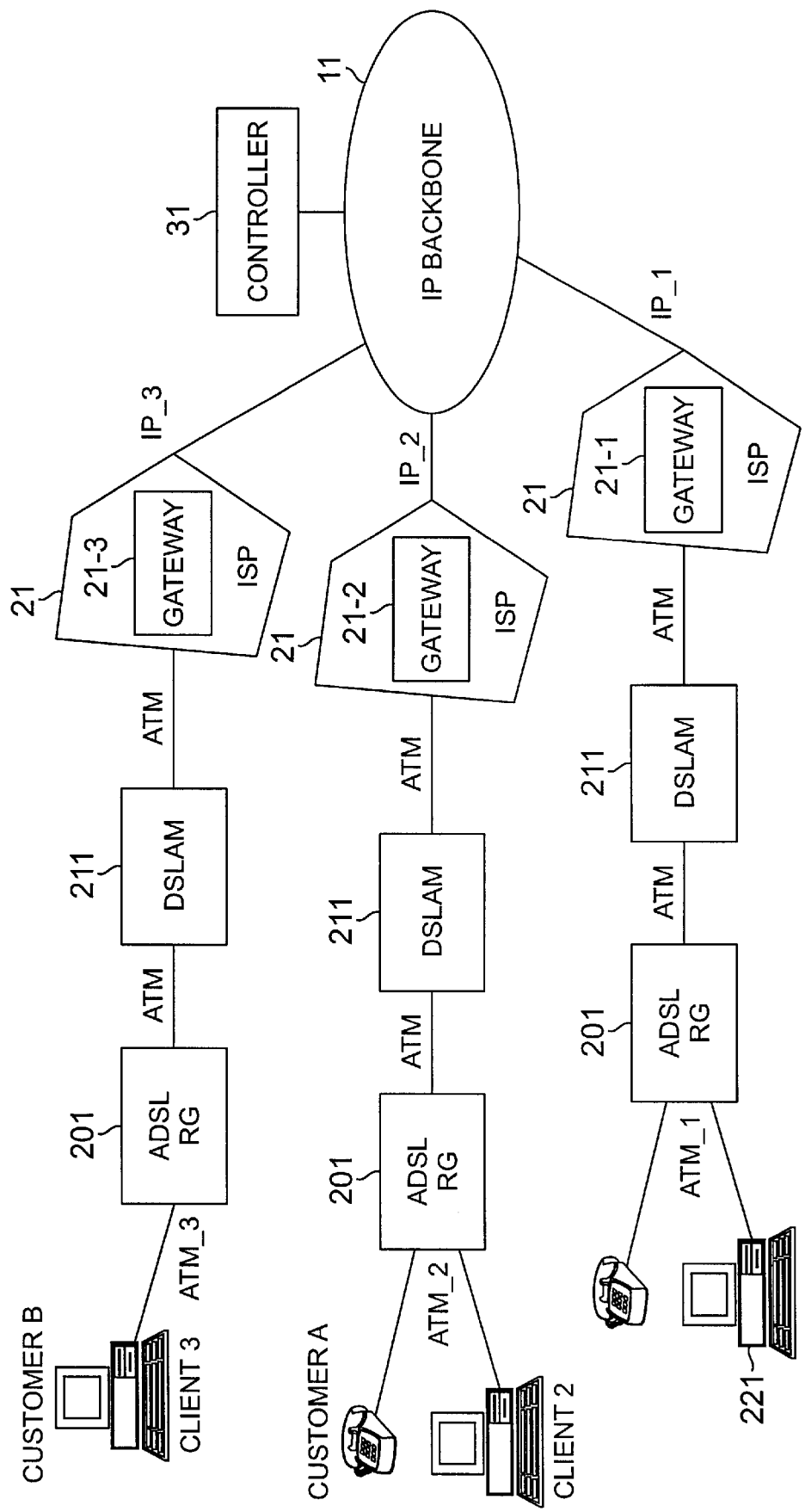
FIG. 6 is a block diagram of a more specific embodiment suitable for multicasting ATM data over an IP backbone.

FIG. 6 is a block diagram of a more specific embodiment of the invention. Here, elements corresponding to those of other figures are represented by like reference characters. In FIG. 6, individual gateways 21 are identified as gateways 21-1 21-2 and 21-3 and have respective addresses IP_1, IP_2, and IP_3. Each of the ATM local accesses 23 includes an Asynchronous Digital Subscriber Line (ADSL) Residential Gateway (RG) 201 located at the residential premises, a Digital Subscriber Line Access Multiplexer (DSLAM) 211 that multiplexes many ADSL residential lines to a single ATM line which is interfaced to a gateways 21. The DSLAM 211 typically resides in a central office or in a remote terminal and routes traffic from residential users to the Public Switched Telephone Network (PSTN) and to Internet Service Providers (FS). In this exemplary embodiment, the gateways 21 are assumed to be located at an Internet Service Provider (ISP). However, the gateway 21 can be located at any site having an interface to the IP backbone. The gateway 21, can use the IP backbone network to transfer one or more ATM cells encapsulated in IP headers according to embodiments of the invention.

One of the ATM passageways includes a customer B with ATM address ATM_3 connected to an ADSL RG 201. A DSLAM 211 multiplexes to the ATM signals from the ADSL RG and routes the traffic to a first gateway 21 identified here as gateway 21-3 with IP address IP-3. Another of the ATM passageways includes a customer A, and a client A with ATM address ATM_2, each connected to an ADSL RG 201. Another DSLAM 211 multiplexes the ATM signals from the ADSL RG 201 and routes the traffic to a second gateway 21 identified here as gateway 21-2 with IP address IP-2. A third of the ATM passageways includes a customer C and a client having a content server 221 with ATM address ATM_1 and is connected to a third ADSL RG 201. A third DSLAM 211 multiplexes the ATM signals from the ADSL RG and routes the traffic to a third gateway 21 identified here as gateway 21-1 with IP address IP-1. The customers and clients as well as the ADSL RG, DSLAM, and gateways are only examples, and many additional elements may be connected through many other gateways to the IP backbone.

In operation here, information or data provider client 1 calls the users, for example, information or data provider calls subscribers to a newsletter, for an urgent update. The information provider calls an ATM address, recognized by the controller as a Multicast Initiating Address (or Multicast Tree Address), and specifies a point-to-multipoint call. The Called Party Subaddress sent by the information provider specifies the IP multicast address that is going to be used by this connection. The controller 31 furnishes pairs of addresses in the translation with the table 51. As one of the pair, the controller 31 translates the ATM Multicast Initiating Address to individual ATM addresses of the end user (subscribers) of the multicast service. As the other of the pair, the controller 31 translates the individual ATM addresses of the subscribers of the multicast service to the IP addresses of the Gateways to which the information or data subscribers are attached. Also, the controller returns an IP Multicast Assigned Address, which serves to send the IP Multicast packets through the IP backbone 11.

The controller 31 returns the ATM/IP address pair to the originating gateway. Since H.323 does not have multicast addresses the originating gateway uses protocol H.323+, a modified version of H.323.

In FIG. 6, the information or data provider having ATM address ATM_1, connected to gateway 21-1 with IP address IP_1, sets up a multicast call to Client A, ATM address ATM-2 connected to gateway with 21-2 IP address IP_2, and Client B, ATM address ATM_3 connected to gateway 21-3 with address IP_3. The Multicast Service Content Server 22-1 uses ATM address ATM_M. There is an entry in the translation table in the table 51 of the controller 31 for ATM_M, (ATM_2, IP_2), (AT_3,IP_3)). Content Server 22-1 sends a Q.2931 SETUP message to gateway 21-1 specifying ATM_M and places it in a Destination Address Information element of the message. Content server 22-1 places IP_M service IP address (IP_M service in FIG. 4) in the Called Party Subaddress Information element of the message. The Destination Address Information element and the Called Party Subaddress Information element are normal contents of calls in Q.2931 signaling messages. Gateway 21-1 sends an LRQ signaling message to the controller 31 and, in the message, requests translation for ATM-M. The controller 31, using table 51, returns {(ATM_2, IP_2), (ATM_3,IP_3)} and IP_M assigned. IP_M_assigned is used to transmit the IP multicast packets over the IP backbone.

Gateway 21-1 then signals to gateways 21-2 and 21-3 using the channel H.225+ set-up messages. The gateways 21-2 and 21-3 are instructed to set-up ATM calls to ATM_2 and ATM_3 respectively, and specify IP_M_service addresses in the Called Party Subaddress information element. Gateway 21-1 also specifies IP_M_assigned and a TAPI (a UDP port in this case) as the transport address. Gateways 21-2 and 21-3 then send out IGMP (Internet Group Management Protocol) messages to their default routers requesting to be attached to the IP multicast tree.

For the IP address at the multicast connection between the gateways, the gateways use a multicast IP address that may be different from the multicast address the end systems use. The gateway at the called party sends an IGMP (Internet Group Management Protocol) message to its associated router requesting attachment to the multicast tree.

The embodiments furnish IP multicast-based services for users connected via ATM/HDSL by data providers with similar connection to the Internet. Specifically, ATM addresses (E.164, or other) are advertised as ATM Multicast Initiating addresses which defines pairs of ATM subscriber user address and an IP gateway address of a gateway associated with the ATM subscriber addresses. They define the extent of a multicast group.

For each ATM Address associated with multicast service there are two possible scenarios. In one, a data provider calls the users, for example, the data provider calls subscribers to a newsletter for an urgent update. The data provider then calls the user's ATM address and specifies a point-to-point (end-to-end) call. The gateway (or controller) analyzes the Called Party Subaddress. If it contains a valid IP multicast address, their multicast rules apply. If not, the call is handled as an ATM point-to-point call. The controller then translates the ATM destination called party address into the IP address of the gateway to which the called party is connected. It then transmits an LCF signaling message to the originating gateway currying the destination IP address of the gateway. The originating and terminating gateways then transmit the necessary H.323+ signaling messages to each other to establish the call end-to-end. The user application receives the IP multicast address from the Called Party Subaddress. For the IP address of the multicast tunnel between the gateways, the gateways use a multicast IP address that may be different from the multicast address the end Systems use. The gateway at the called party sends IGMP message to its associated router requesting to be attached to the multicast tree.

If the information user (subscriber) calls, a similar scenario is used. The user calls the advertised ATM-connected multicast address (during which the user equipment is not aware of multicast). The gateway recognizes a multicast address and terminates the ATM call at the gateway (connect). The controller 31 returns the IP multicast address to be used by the end system in the called Party Subaddress information element. The controller then tells the gateway the IP Multicast address to be used over the IP network. The controller also returns the provider's ATM address and the IP address of its associated gateway. This allows the customer's system to establish an end-to-end connection to the content server. This connection is used for content selection via the IP_M service address and a Port number that the content server provides to the client application. It can also be used for billing. The gateway at the calling party sends an IGMP message to its associated router requesting to be attached to the multicast tree.

The arrangement allows network providers to sell value added services (address translation, multicast VPN (Virtual Private Network), billing services to entrepreneurs connected to the network via ATM/HDSL. The Multicast Initiating Address is an ATM address which may for example be an 800 telephone number.

In the above, one of the parties may be directly connected to the IP backbone. Other applications such as multi-player gaming or streaming video or audio applications are also possible with modifications to the above-described example.

The terms "connect", "connected", "connection", "coupled", "coupling", "couple", etc as used herein contemplates any kind of arrangement including use of wire, wireless, cable, satellite, optical, etc. systems. The IP gateways 21 are shown as coupled to the IP backbone 11, but may also be part of the IP backbone.

The acesses composed of ADSL, RG, DSLAM, and other elements are only examples and can include additional or other elements used in the telephony and internet art. For example, the acess may use modems, cables, cable TV, satelites and other devices.

Although the present invention is described in various illustrative embodiments, it is not intended to limit the invention to the precise embodiments disclosed herein. Accordingly, this description is to be construed as illustrative only. Those who are skilled in this technology can make various alterations and modifications without departing from the scope and spirit of this invention. Therefore, the scope of the present invention shall be defined and protected by the following claims and their equivalents. The exclusive use of all modifications within the scope of the claims is reserved.

What is claimed is:

1. A method for conducting Asynchronous Transfer Mode (ATM) coupled multicast service over an Internet Protocol (IP) based network comprising the steps of:

receiving a multicast initiating address from a multicast source at an IP network controller, the multicast initiating address providing a pointer into a lookup table associated with the IP network controller;

translating the multicast initiating address into a plurality of groups of addresses at the IP network controller, each group comprising an ATM destination address and an IP gateway address associated with a corresponding multicast receiver;

establishing connections between the multicast source and the multicast receivers; and transmitting multicast data to the multicast receivers.

2. The method of claim 1, further comprising the step of sending an ATM signaling message comprising the multicast initiating address and an IP multicast service address from the multicast source to a source gateway.

3. The method of claim 2, further comprising the steps of:

terminating the ATM signaling message at the source gateway; and converting the ATM signaling message into an intermediate signaling protocol in the source gateway before transmitting the multicast initiating address to the IP network controller.

4. The method of claim 2, further comprising the step of transmitting the groups of addresses from the IP network controller to the source gateway.

5. The method of claim 4, wherein the step of establishing connections further comprises the steps of:

calling destination gateways from the source gateway; and sending signaling messages to the destination gateways instructing them to call multicast receiver addresses.

6. The method of claim 5, wherein the step of sending signaling messages to the destination gateways comprises the step of sending the destination gateways the ATM destination address and the IP multicast service address.

7. The method of claim 2, wherein the step of establishing connections further comprises the steps of:

providing the multicast receivers with the IP multicast service address;

confirming to the source gateway that destination gateways have connected to the multicast receivers;

sending Internet group management protocol messages from the destination gateways to default routers in an IP backbone requesting attachment by the IP network controller to a multicast group.

8. The method of claim 1, wherein the lookup table comprises a destination look-up table and a multicast look-up table.

9. The method of claim 1, wherein the multicast data is transmitted over an IP network backbone.

10. The method of claim 9, wherein the step of transmitting multicast data comprises the steps of:

encapsulating IP multicast data in ATM cells at the source;

sending ATM cells to a source gateway;

encapsulating ATM data from the ATM cells in IP multicast packets with an ATM destination address and an IP multicast service address at the source gateway;

multicasting the IP multicast packets over the IP backbone;

decapsulating the ATM data from the IP multicast packets at destination gateways; and transmitting the ATM data to the multicast receivers.

11. The method of claim 1, wherein the multicast initiating address is prestored in the IP network controller.

12. The method of claim 1, further comprising the step of associating routers with destination gateways forming a multicast tree for the transmission of multicast data from the multicast source to the multicast receivers.

13. The method of claim 1, wherein the multicast source comprises a content server.

14. The method of claim 1, further comprising the steps of receiving a multicast access address and storing the multicast access address in the IP network controller.

15. The method of claim 14, further comprising the step of requesting access to an existing multicast group by an additional multicast receiver.

16. The method of claim 15, wherein the step of requesting access to an existing multicast group comprises the steps of:

sending a multicast access address from the additional multicast receiver to a destination gateway;

sending a multicast service address from the destination gateway to the IP network controller;

returning an IP multicast address from the IP network controller to the destination gateway;

sending an Internet group management protocol message to a router requesting attachment to the existing multicast group; and forwarding IP packets to the additional multicast receiver.

17. The method of claim 16, further comprising the steps of:

receiving encapsulated IP packets at the destination gateway; and decapsulating the encapsulated IP packets before forwarding the IP packets to the additional multicast receiver.

18. A system for conducting ATM coupled multicast service over an IP based network, comprising:

a multicast source for providing a multicast transmission;

a plurality of multicast receivers for receiving the multicast transmission;

a plurality of routers and gateways connecting the multicast source to the plurality of multicast receivers and permitting the transmission of data between the multicast source and the plurality of multicast receivers; and an IP network controller having a memory with a lookup table, wherein the IP network controller is configured to receive a multicast initiating address from the multicast source providing a pointer to the lookup table, and to translate the multicast initiating address into a plurality of groups of addresses, each group comprising an ATM destination address and an IP gateway address associated with a corresponding multicast receiver.

19. An IP network controller in a system for conducting ATM coupled multicast service over an IP based network, the IP network controller comprising:

a memory, configured to store a lookup table;

the IP network controller being configured to receive a multicast initiating address from a multicast source providing a pointer to the lookup table, and to translate the multicast initiating address into a plurality of groups of addresses, each group comprising an ATM destination address and an IP gateway address associated with a corresponding multicast receiver;

wherein connections established between the multicast source and the multicast receivers enable multicast data to be transmitted to the multicast receivers.

20. An article of manufacture for use in conducting ATM coupled multicast service over an IP based network, comprising a machine readable medium containing one or more programs which when executed implement the steps of:

receiving a multicast initiating address from a multicast source at an IP network controller, the multicast initiating address providing a pointer into a lookup table associated with the IP network controller; and translating the multicast initiating address into a plurality of groups of addresses at the IP network controller, each group comprising an ATM destination address and an IP gateway address associated with a corresponding multicast receiver;

wherein connections established between the multicast source and the multicast receivers enable multicast data to be transmitted to the multicast receivers.

* * * * *